United States Patent [19]

van der Schoot

[11] Patent Number: 5,040,690

[45] Date of Patent: Aug. 20, 1991

[54] ROLLING CONTAINER

[75] Inventor: Jelle van der Schoot, Aalten, Netherlands

[73] Assignee: Staalkat B. V., Aalten, Netherlands

[21] Appl. No.: 507,192

[22] Filed: Apr. 10, 1990

[51] Int. Cl.$^5$ ............................................... A47F 5/00
[52] U.S. Cl. ..................................... 211/135; 211/186; 280/47.35; 280/79.3
[58] Field of Search ............... 211/135, 186, 187, 126, 211/133; 280/47.35, 79.3

[56] References Cited

U.S. PATENT DOCUMENTS

| | | | |
|---|---|---|---|
| 1,554,011 | 9/1925 | Lehman | 211/187 X |
| 1,600,757 | 9/1926 | Foster | 211/135 X |
| 1,711,329 | 4/1929 | Short | 211/135 |
| 1,854,777 | 4/1932 | Bales | 211/135 X |
| 2,631,913 | 3/1953 | Rosenberg | 211/135 X |
| 4,593,826 | 6/1986 | Bustos | 211/187 |
| 4,621,740 | 11/1986 | Lang | 211/133 |
| 4,886,286 | 12/1989 | Whorton | 280/47.35 |
| 4,895,382 | 1/1990 | Andersson | 280/79.3 X |
| 4,901,872 | 2/1990 | Lang | 211/133 |

Primary Examiner—Robert W. Gibson, Jr.
Attorney, Agent, or Firm—Griffin, Branigan & Butler

[57] ABSTRACT

A rolling container for stacks of egg trays, comprising a wheeled frame including interconnected upright sections and sidewalls, and presenting a plurality of storeys separated by shelves with a relatively low front edge, characterized in that the container has a completely open front and the shelves are fixedly mounted, the arrangement being such that adjacent stacks can be taken out all at the same time.

18 Claims, 3 Drawing Sheets

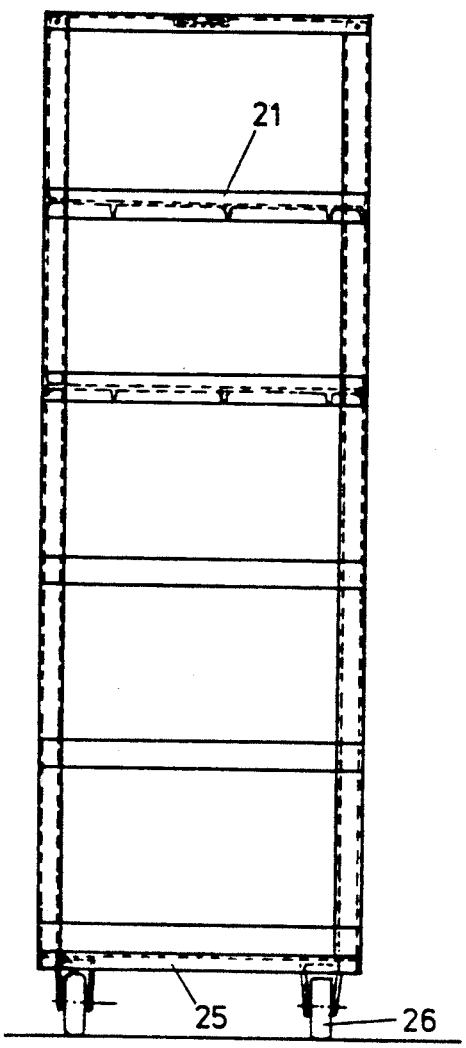
FIG.5
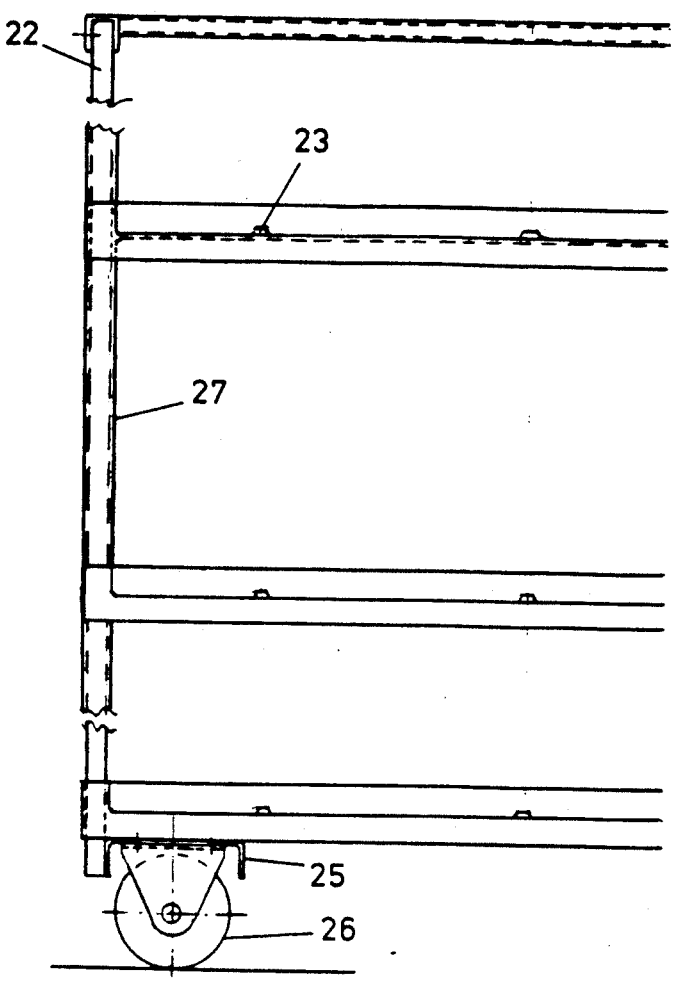
FIG.6
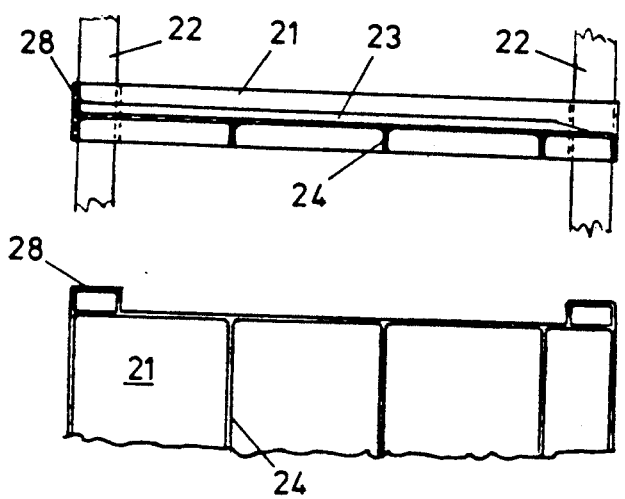
FIG.7
FIG.8

ROLLING CONTAINER

This invention relates to a rolling container comprising a wheeled frame arranged to contain stacks of filled egg trays, said container presenting a plurality of storeys separated by shelves, said shelves having a relatively low front edge.

A rolling container of this kind is described in applicant's British Patent Application 2,106,070.

One disadvantage of this known container is that the shelves are each provided with a depending flange serving as a stiffening means against sagging from the stacks of filled trays carried by the shelves The consequence is that during discharge it is always necessary for the shelf above that being discharged to be lifted to move the flange out of the way. This makes it necessary for the known equipment to have means for locating the lower edge in order that the shelf in question may be lifted.

A further disadvantage of the known containers is their wide variation in inside and outside dimensions, as a result of which they cannot be handled, e.g. loaded and unloaded, automatically. Also, in the existing containers, improperly aligned stacks or stacks with damaged trays may get stuck behind upright frame members carrying the shelves while they are being taken out.

It is an object of the present invention to eliminate these drawbacks and disadvantages.

According to the present invention, there is provided a rolling container for stacks of egg trays, comprising a wheeled frame including interconnected upright sections and sidewalls, and presenting a plurality of storeys separated by shelves with a relatively low front edge, characterized in that the container has a completely open front and the shelves are fixedly mounted, the arrangement being such that adjacent stacks can be taken out all at the same time.

The shelves may be spaced fixed distances from the underside of the bottom shelf, so that the container may be unloaded fully automatically, by virtue of the fact that the underside of the bottom shelf can be used as a stop and a reference for all shelf levels, and major deviations resulting from damaged or out-of round wheels are eliminated.

In a preferred embodiment of the invention, the shelves have a rounded or beveled front edge to facilitate the insertion of transport forks.

In a further elaboration of the invention, where the front of the container is fully open so that all front stacks may be taken out simultaneously, use is made of shelves provided with positioning ridges extending from the front to the back. This ensures that, as a result of fixed relative positioning, adjacent stacks can be taken out with facility.

Advantageously, the ridges are triangular or trapezoidal in shape to fit at least one tunnel of each of the lowermost trays.

In another embodiment of the invention, the ridges are U-shaped in section.each to fit two tunnels of each of the lowermost trays.

In a further embodiment of the invention, the sidewalls of the container are closed This ensures proper relative positioning and prevents trays from catching behind vertical frame members and from becoming lodged behind trays of adjacent stacks, thereby causing failure in operation.

A variant of this last embodiment is one in which the sidewalls are made of perforated sheeting or wire mesh.

In structural respects, a highly simple product is provided when, in accordance with the present invention, each of the sidewalls is formed integrally with two associated upright frame members of the container.

To ensure that the stacks may be readily shifted out of the container, the back of the container may be open except for two upright frame members at the points of separation of the stacks.

To promote ease of assembly and disassembly; the rolling container may be composed of stackable elements, which in addition results in a saving in cost of transport of empty containers and cost of storage.

Conveniently, in that embodiment, the shelves are made of metal or plastics and shaped to be shifted around upright frame members.

In addition to the egg tray positioning ridges formed on the upper surface of the shelves, the shelves may be provided with stiffening ridges at their bottom surface.

Furthermore, the upright frame members may be interconnected at their lower ends by a section bar further mounting two of the container wheels Furthermore, the shelves may be spaced the proper distance apart by distance pieces Such distance pieces may be of the kind designed to be shifted onto the upright frame members, or of the kind designed to form upright frame members.

One embodiment of the invention will now be described, by way of example, with reference to the accompanying drawings, in which FIG. 1 shows a perspective view of the container according to the invention;

FIG. 2a shows a detail of the container illustrated in FIG. 1; and

FIG. 2b a different embodiment of the detail illustrated in FIG. 2a;

FIG. 5 shows a diagrammatic side-elevational view of a different embodiment of the rolling container according to the present invention;

FIG. 6 shows a front elevational view of a portion of the container illustrated in FIG. 5;

FIG. 7 shows an enlarged detail of the container shown in FIG. 5; and

FIG. 8 shows a portion of a bottom view of the container illustrated in FIG. 7, but with the uprights being removed.

Figure 1:
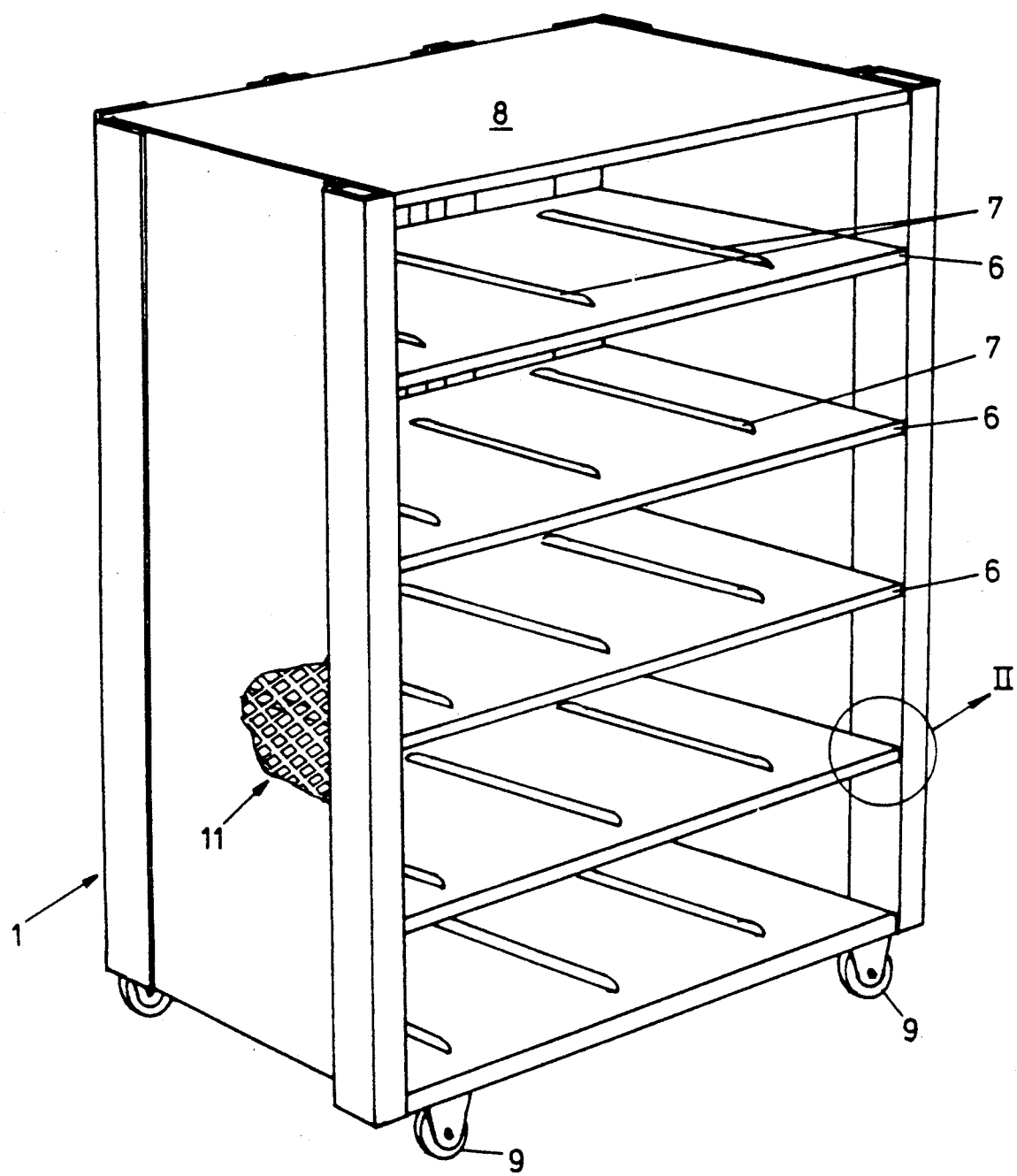

Referring to the drawings, there is shown a container, generally indicated at 1, comprising at least four vertical or upright corner sections 2, 3, 4 and 5 (see FIG. 4) and a number of shelves 6 (in this case five), each formed with three ridges 7 extending longitudinally of the container, i.e., from the front to the back. The container further comprises a top shelf or cover 8.

Figure 2A:
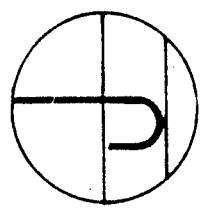
Figure 2B:
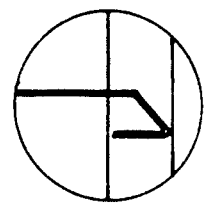

As best shown in FIG. 1, the bottom shelf 6 is provided with a number of wheels 9. Shelves 6 may be rounded at the front in the manner shown in FIG. 2a or beveled as shown in FIG. 2b. In both cases, the prongs of a fork lift truck or the like for the discharge of the stacks of trays will be smoothly and readily guided.

Figure 4:
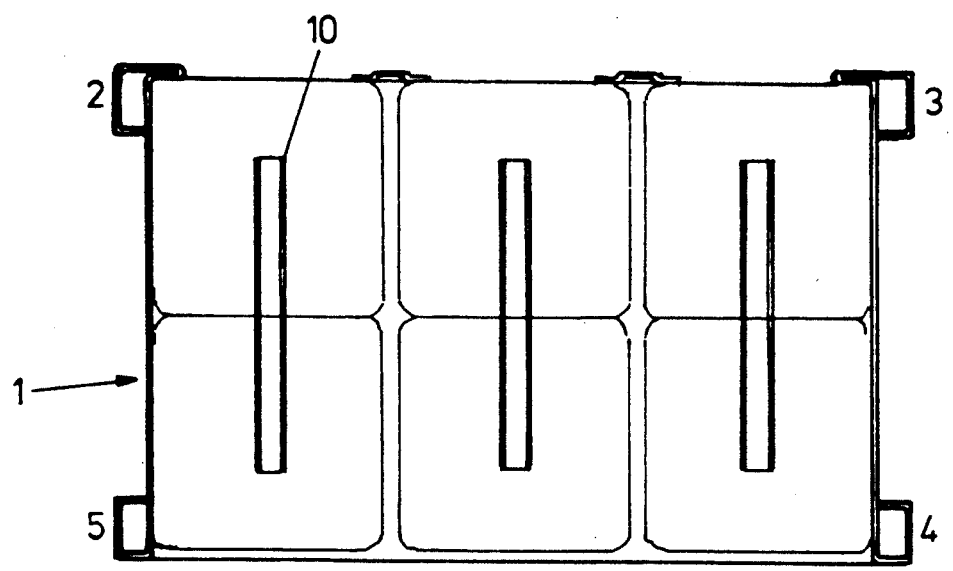
FIG. 4 shows a top view of a portion of the container illustrated in FIG. 3, with the top closing shelf being removed.

As best shown in FIG. 4, the upright frame members may be made two by two together with the intermediate sidewall of one piece of material, for example, steel sheeting, perforated sheeting or wire mesh. This, too, will ensure proper guidance of the stacks. As further shown in the drawings, sections 2 and 3 are formed as angle sections, and sections 4 and 5 as rectangular channel sections In this way, the container is perfectly freely accessible at one end.

Figure 3:
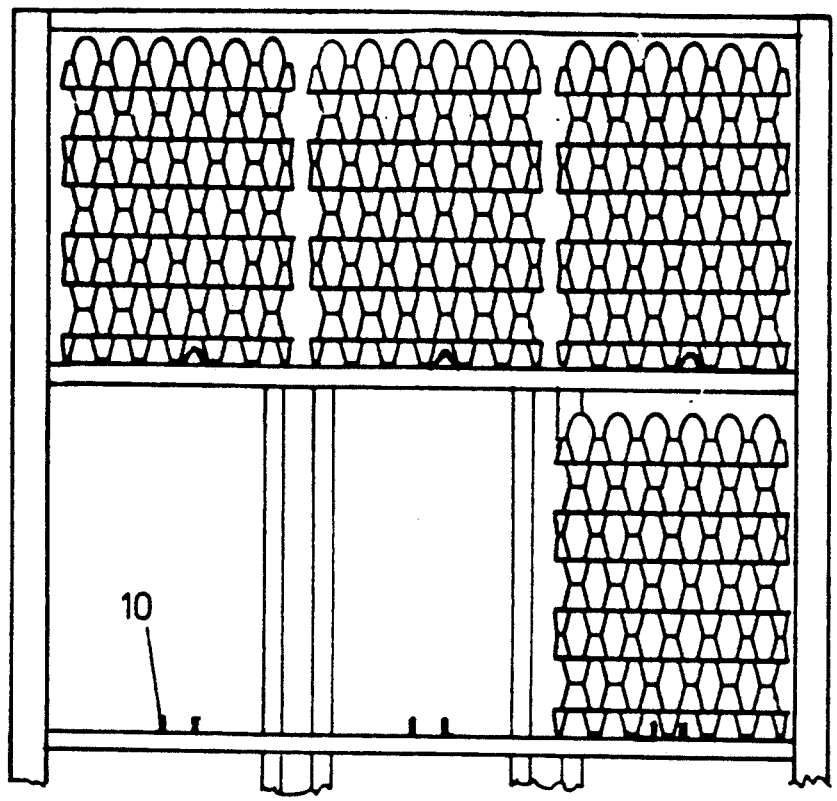
FIG. 3 shows a front elevational view cf a portion of a partially filled container.

A further feature of the container shown in FIGS. 3 and 4 is that the shelves are provided with U-shaped ridges 10 instead of triangular, trapezoidal or round ridges 7.

FIG. 1 further shows a feature, designated by 11, of a modified embodiment in which the sidewall is made of perforated sheeting or wire mesh.

As, in the construction according to the invention, shelves 6 are in a fixed position relative to the bottom shelf of the container, the stacks of trays will always be at the same level, even in case wheels 9 are damaged or reduced in size from wear, which is of essential importance when the rolling container is used with equipment for discharging stacks of trays fully automatically.

As shown in FIGS. 5-8, the rolling container according to the invention may consist of a plurality of uprights 22 interconnected by means of shelves 21. The shelves may be provided with cut-outs to accommodate uprights 22, or formed with guiding sleeves 28 in which the uprights are received.

The shelves may be provided at the top with edge tray positioning ridges 23, which may be similar to those described with reference to the embodiment of FIGS. 1-4, and reinforcing ridges 24 at the bottom.

It is further noted that the uprights are interconnected two by two at their lower ends by a section bar 25 which further mounts two container wheels 26.

The advantage of the stacking construction illustrated in FIGS. 5-8 is that empty containers may be stored and transported disassembled into their constituents parts, and thus occupy a small volume only, which makes for substantial savings in cost.

A further variant is provided when a shelf is combined with a distance piece 27 forming an element at the level of a stack of filled trays to be transported. Such elements, too, are transportable in a relatively small volume, while on the other hand they can be assembled to form a rigid whole.

Naturally, many variants and modifications can be made without departing from the scope of the present invention.

What I claim is:

1. A rolling container for rolling on a floor and having front, back and side portions, which container is suitable for carrying stacks of egg trays, comprising:
   (1) a generally rectangular bottom frame having front, back and side portions and a solid, bottom shelf supported by said bottom frame;
   (2) upright sections connected near at least corners of said frame and extending vertically from said frame;
   (3) wheels extending below said frame and said bottom shelf, whereby said container is supported from and rollable on a floor; and
   (4) a plurality of spaced-apart solid, horizontal further shelves disposed above said bottom shelf such that the distance between all shelves is the same and at least most of the further shelves are fixedly mounted on said upright sections, wherein equal stories for containing stacks of egg trays are provided between spaced-apart adjacent shelves, wherein each shelf has a relatively low front edge at the front portion of the container, which edge portion is suitable for slidably passing thereover fork means for inserting into tunnels of lowermost egg trays for unloading stacks of egg trays contained in said stories, and wherein adjacent upright sections connected near corners at the front of the container are disposed such that the front of the container is completely opened with respect to the shelves so that adjacent stacks of egg trays can be removed from a shelf at one time through the front of the container.

2. A rolling container as claimed in claim 1, wherein the shelves are spaced at fixed distances from the underside of the bottom shelf.

3. A rolling container as claimed in claim 1, wherein the front edge of the shelves is rounded or beveled.

4. A rolling container as claimed in claim 1, wherein the front of the container is fully open so that all stacks disposed at the front of a shelf can be taken out simultaneously, and wherein the shelves are provided with egg tray positioning ridges on an upper surface thereof, said ridges extending from the front to the back of the container.

5. A rolling container as claimed in claim 4, wherein the ridges have a triangular or trapezoidal shape to fit at least one tunnel disposed of each of the lowermost egg trays.

6. A rolling container as claimed in claim 4, wherein the ridges are U-shaped in section each to fit two tunnels of each of the lowermost egg trays.

7. A rolling container as claimed in claim 1, wherein the container has sidewalls.

8. A rolling container as claimed in claim 7, wherein the sidewalls are made of perforated sheeting or wire mesh or like material.

9. A rolling container as claimed in claim 7, wherein each of the sidewalls is formed integrally with two associated adjacent upright sections.

10. A rolling container as claimed in claim 1, wherein the back of the container is open except for portions of the two adjacent upright sections at the back of the container.

11. A rolling container as claimed in claim 1, wherein metal or plastic shelves are shaped to be fitted around the upright sections.

12. A rolling container as claimed in claim 4, wherein the shelves are provided in addition to the egg tray positioning ridges with one or more reinforcing ridges at the bottom of each shelf.

13. A rolling container as claimed in claim 11, wherein the upright sections connected at their lower ends by a section bar further mounting two of the said container wheels.

14. A rolling container as claimed in claim 1, wherein the shelves are spaced the proper distance apart by distance pieces.

15. A rolling container as claimed in claim 1, wherein the shelves are provided with cutouts for passing the upright sections therethrough.

16. A rolling container as claimed in claim 1, wherein the shelves are formed with guiding sleeves for receiving said upright sections and distance pieces for spacing the shelves from each other.

17. A rolling container as claimed in claim 1, wherein the upright sections are removably connected to said frame and the shelves are removably connected to said upright sections, wherein the upright sections and shelves may be disassembled and whereby such a disassembly container, when empty, may be stored or transported in a relatively small volume of space.

18. A rolling container as claimed as claimed in claim 1, wherein sidewalls are connected to adjacent upright sections whereby the side portions of the container are closed thereby.

* * * * *